Patented Apr. 22, 1941

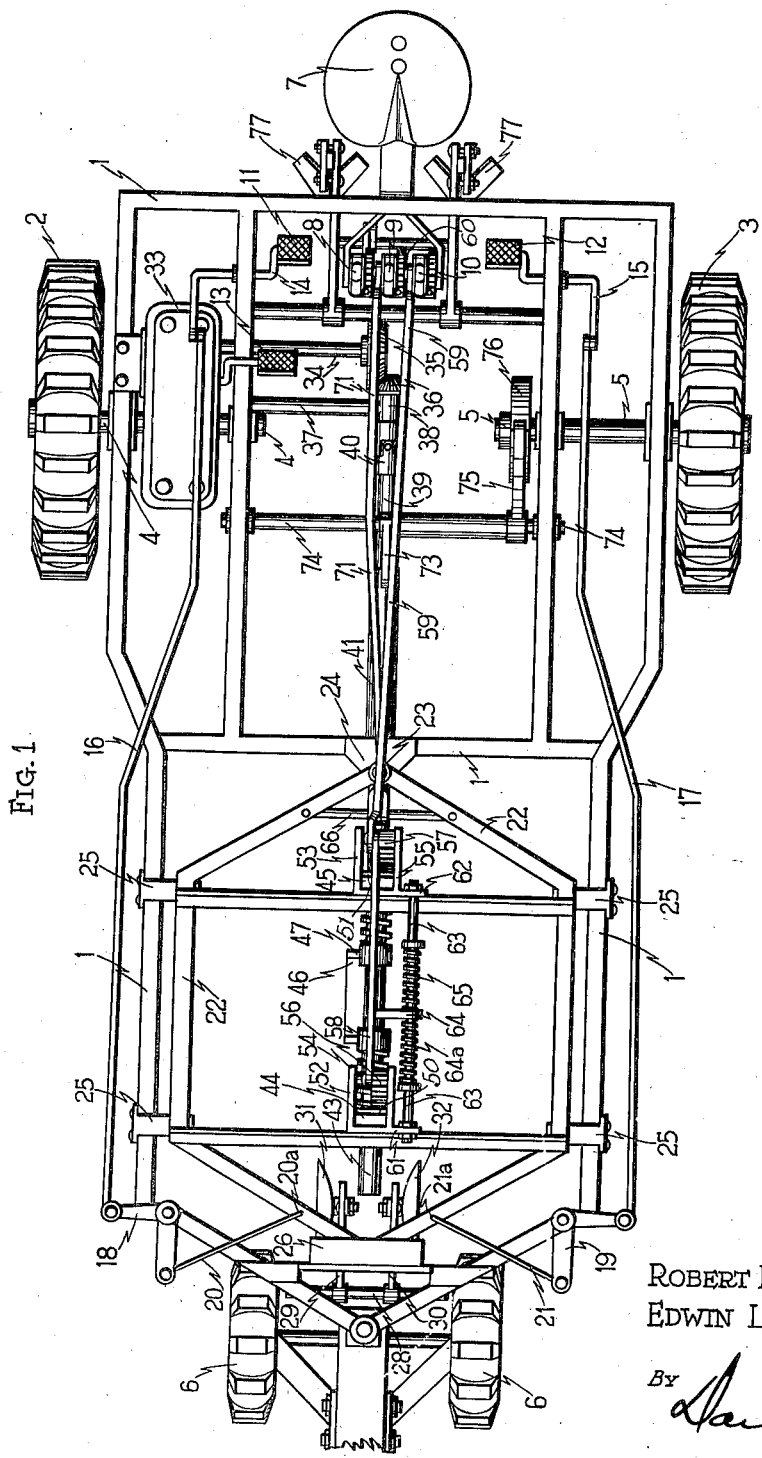

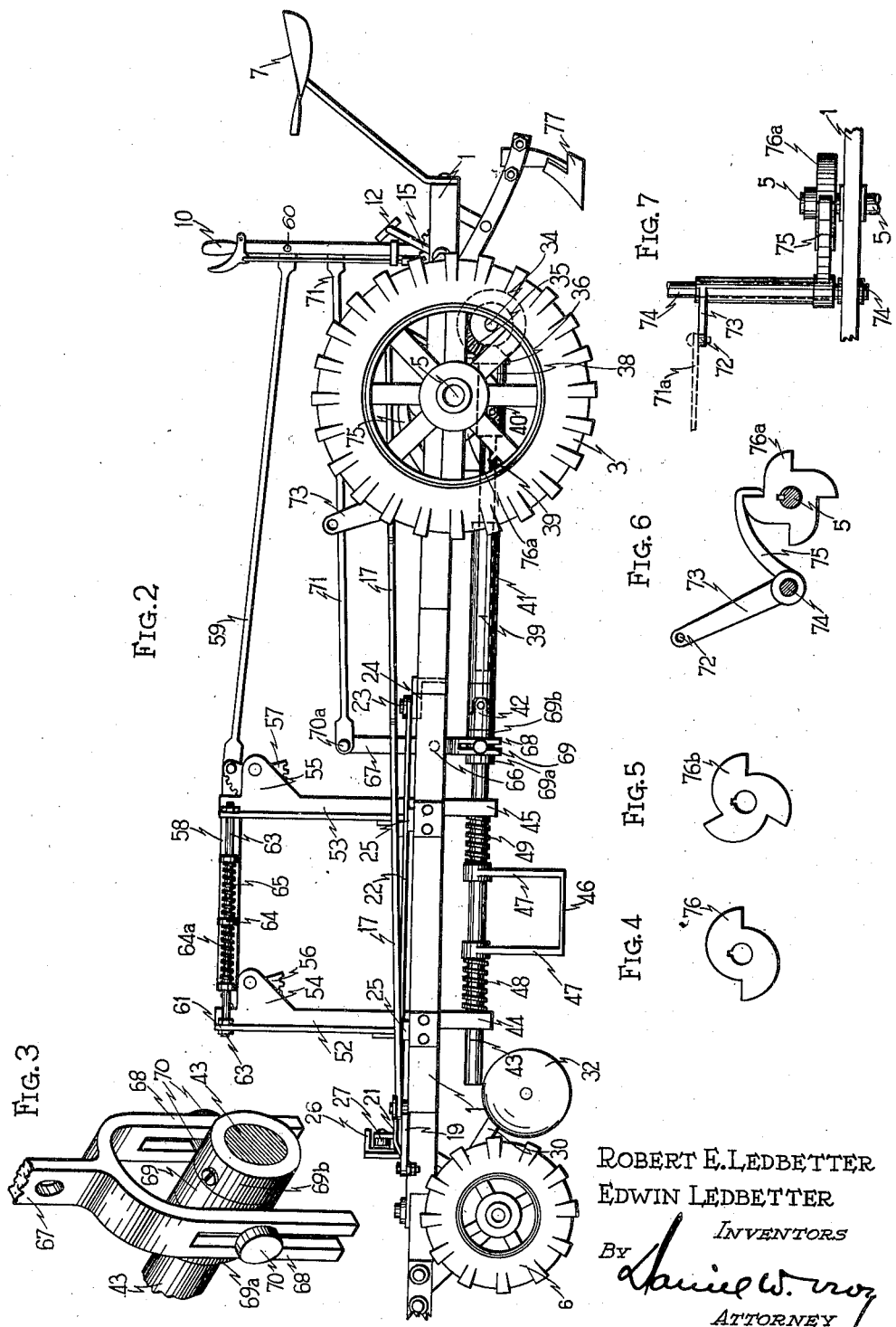

2,239,153

UNITED STATES PATENT OFFICE 2,239,153

CROSS CULTIVATOR

Robert E. Ledbetter and Edwin Ledbetter, Montgomery, Ala.

Application August 4, 1939, Serial No. 288,282

2 Claims. (Cl. 97—15)

The invention relates to agricultural apparatus; and the object is to provide a new, simple, inexpensive, and reliable mechanized cross cultivator having a rotary chopping hoe and means arranged whereby said hoe may be raised and lowered, advanced and retrogressed, and swung radially from side to side, to meet positional requirements arising from spatial intervals and lineal irregularities of plant growth in the drill to be cultivated.

A special object of the invention is to provide such a cultivator having means arranged to advance a rotary chopping hoe instanter after having substantially caused said hoe to rotate in a plane, rather than in a helix, during one chopping operation while the carriage of the cultivator is in continuous forward motion, the purpose of this special object being to prevent the hoe from chopping at substantially less than ninety degrees to the drill notwithstanding said forward motion of the cross cultivator as a whole.

In the drawings:

Fig. 1 is a plan view of the cultivator.

Fig. 2 is a side elevational view of the cultivator.

Fig. 3 is a rectilinear perspective view of the means provided for axially shifting the chopping hoe shaft.

Figs. 4, 5, 6, and 7 are details of the automatic means for causing the chopping hoe to rotate in a chopping operation in a substantial plane, rather than helix, notwithstanding a concurrent forward motion of the cultivator as a whole. Figs. 4 and 5 show two different kinds of cams to be separately employed for controlling said automatic means. Fig. 6 shows in side elevation the relationship between a third kind of cam and an offset bell crank 75, while Fig. 7 shows the same relationship in plan from above. The cams shown in Figs. 4, 5, and 6 (and 7) are respectively employed at different times to effect axial shifting of the hoe shaft twice, three times, and four times per revolution of axle 5.

The carriage of the cultivator is of a simple frame construction, the frame being designated as 1 (see particularly Fig. 1). Preferably the frame 1 is of angle stock welded in form.

For reasons to be set forth below it is not desirable that the rear wheels of the carriage, said wheels being designated as 2 and 3, be mounted upon a common shaft. Thus the frame is so constructed, as shown in Fig. 1, that stub shafts 4 and 5, journaled in the frame on either side so as to be coaxial, although disconnected, serve as the rear wheel mounts.

The forward end of the frame is supported by a two-wheel bogie. The bogie wheels are designated as 6, 6. The forward end of the frame is pivotally mounted on the bogie by the common method wherein a kingpin or the like is dropped through an eyelet in the frame and through the butt of a singletree, the latter here (Fig. 1) being shown erased just forward of the carriage proper.

Supported by a standard rising from the endmost lateral strut of the carriage frame 1 is a seat 7. Conveniently placed before the seat 7 are three manually controllable levers, 8, 9, and 10, pivoted on a shaft supported by a bracket fixed to said endmost strut.

Also conveniently placed before the seat 7 are three pedals, 11, 12, and 13, two of them being provided for operation by the right foot of the driver of the cultivator, the other for operation by his left foot.

The pedals 11 and 12 are of similar construction, being fixed to cranks 14 and 15 respectively, each of said cranks being journaled in a strut of the frame 1, and each being connected pivotally to a long tierod running from the rear to the forward end of the carriage. The tierod connected to crank 14 is designated as 16; that connected to crank 15 is designated as 17. Each tierod is slightly offset, as shown in Fig. 1, to clear certain forward parts of the cultivator; and each tierod is pivotally connected at the forward end of the carriage to a bellcrank. The two bellcranks, 18 and 19, are pivotally mounted to the frame 1 so as to rotate in horizontal planes. Each bellcrank is also pivotally connected to a link, these links being 20 and 21, respectively engaging the frame 22,—a hexagonal frame arranged to move relatively with respect to frame 1, and described below in detail,—as shown in Fig. 1, pivotally at 20a and 21a. Frame 22 is pivoted at 23 to bracket 24.

The hexagonal frame 22, best seen in Fig. 1, is supported by four brackets 25, 25, 25, 25, which are fixed to the carriage frame 1. The hexagonal frame 22 is free to slide on the four brackets. Frame 22 is further supported by a short channel 26 fixed to a forward lateral strut of frame 1. The forward end of the frame 22 is provided with a small roller 27 (see Fig. 2), which is received within and rolls on the lower flange of the channel 26.

Thus, by means of the pedals 11 and 12, and the interconnections described above, the hexagonal frame 22 may be rotated slightly in a horizontal plane on a center at 23, the roller 27 taking a long-radius arcuate path within the channel 26.

Pivotally mounted on a shaft 28 suitably supported at the extreme forward end of the carriage frame 1, but not clearly shown in the figures, are two cantilever drags 29 and 30, provided at their rear extremities each with a rotary plow. The plows are designated as 31 and 32.

The stub shaft 4, on which is mounted the righthand rear wheel 2, passes through a suitable transmission box 33, as shown in Fig. 1. The transmission means are such that a shaft 34, extending to the lateral centerline of the carriage of the cultivator from the transmission box, is caused to rotate at a predetermined rate with respect to the rate of rotation of the stub shaft 4. A clutch, not shown, but assumed to be provided within the transmission box, is controlled by pedal 13.

The shaft 34, extending from the transmission box to the carriage centerline at right angles to the axis of the cultivator, is provided at its inner end with a bevel gear 35, which engages another bevel gear 36 on the rear end of a stub shaft whose axis is aligned with that of the cultivator and which stub shaft is journaled within support 37 (a rigid cantilever extending from a longitudinal frame strut inwardly to the lateral center of the cultivator) at 38. The forward end of the stub shaft (no index number, as the stub shaft, being wholly obscured by gear 36, support 37, and the joint presently to be mentioned, is not seen in the figures), just anterior to support 37, is connected to another more or less coaxial stub shaft 39 by means of a universal joint 40.

The forward end of stub shaft 39 is preferably squared, and is received within a squared broaching within a shaft 41 (see Fig. 2). The forward end of the shaft 41 is connected by means of another universal joint 42 to the posterior end of the chopping hoe shaft 43.

The chopping hoe shaft 43 is journaled in two members 44 and 45, to be subsequently described.

The chopping hoe 46 is carried by two radial arms 47, 47, each arm being integral with a collar fixed upon the shaft (cf. Fig. 2). On either side of the pair of arms, and carried on shaft 43 between a journal of the shaft and a fixed collar of an arm 47, is a compression spring. The two compression springs are designated as 48 and 49 (see, particularly, Fig. 2), and serve normally to keep the shaft 43 in such axial relationship with respect to the cultivator as a whole that the hoe 46 is equidistant from 44 and 45.

The members 44 and 45 are vertically disposed bars having positional relationship to each other as shown in Fig. 2. The lower extremities of the bars are bored to provide journals for the hoe shaft 43. The bars 44 and 45 are slidably carried in upright guide members rigidly fixed to transverse struts of the hexagonal frame 22 (see Fig. 1, particularly). On the posterior surface of each bar, at the upper part thereof, is provided a rack. These racks,—50 on bar 44; 51 on bar 45,—are nowhere fully shown, and their upper ends only can be seen in the single figure (Fig. 1) that shows them at all.

The guide members for bars 44 and 45 are designated as 52 and 53 respectively. Pivotally mounted on the posterior upper end of guide member 52 on an extension 54 of the flange of the guide member (see Fig. 2), and on the posterior upper end of guide member 53 on an extension 55 of the flange of the guide member (see Fig. 2), are two incomplete pinions, 56 and 57, respectively engaging racks 50 and 51. These incomplete pinions serve to lock the vertical position of the shaft 43, when said pinions are relatively stationary, inasmuch as then bars 44 and 45 cannot move upward or downward in their respective guide members; and the pinions otherwise serve as means for raising and lowering these bars 44 and 45, and, by extension, the shaft 43.

A link 58, pivotally engaging, and connecting, the pinions 56 and 57, as shown in Fig. 2, causes them to rotate together. From the pivotal connection between link 58 and pinion 57 another link 59 extends rearwardly to manually controllable lever 10 (Figs. 1 and 2), and is pivotally connected thereto at 60.

A neutral position of link 58 with respect to the upright guide members 52 and 53 (and neutrality of position of the related pinions 56 and 57) is attained automatically if the link 58 is not restrained by link 59 and lever 10, the latter being assumed to be arranged to be locked, as is the custom in many types of farm machinery wherein manually controllable levers are provided for the purpose of governing, from the driver's seat, some remote moving part of the apparatus. The neutralizing mechanism consists in two flanges, one on each upright guide member,—the flanges being designated as 61 and 62,—joined by a rod 63; fixed collars on said rod; a lug 64 protruding from link 58 and slidably linked on said rod between said collars; and two compression springs carried on said rod, one spring on either side of said lug and between said lug and one of said fixed collars (see Figs. 1 and 2). The compression springs are designated as 64a and 65.

Pivoted at 66 (see Fig. 2, particularly) on the hexagonal frame 22 is a lever 67, the lower end of which is bifurcated (see Fig. 3), each branch being in turn again bifurcated, so as to provide slots. The branches are designated as 68, 68. Note particularly in Fig. 3 that the hoe shaft 43 is provided with a free collar 69, having two studs protruding therefrom, one on either side; these studs are headed, and are received slidably in the slots provided between the bifurcations of the branches 68, 68. The free collar is prevented from moving axially on shaft 43 by locked collars 69a and 69b. The studs of the free collar 69 are designated as 70, 70.

At the upper end of lever 67, at 70a, said lever is pivotally connected by a link 71 to manually controllable lever 9. (See Fig. 1.) It will be obvious that the hoe shaft 43 may be manually controlled from the driver's seat by means of lever 9 so as to change the anterior-posterior disposition of the hoe with respect to the cultivator as a whole. Obviously changes in the anterior-posterior disposition of the hoe as described cause corresponding changes of position with respect to the cultivator as a whole of certain other parts, e. g., universal joint 42, shaft 41, etc. The squared end of stub shaft 39, having axial freedom of movement in the squared broaching in shaft 41, anterior-posterior movements of the universal joint 42 do not interfere with transmission of rotary motion from the rear wheel 2 to the hoe shaft 43.

Where it is desired to utilize the rotary motion of the stub shaft 5 for periodically shifting the hoe shaft 43 as described above, the tie rod or link 71 may be removed. The automatic, as opposed to the manual, anterior-posterior shifting of shaft 43 is described immediately below.

Where it is desired that the hoe be periodically shifted backward and forward with respect to the cultivator as a whole, so that chopping operations of the hoe may be substantially normal to the drill even while the cultivator is moving forward with respect to said drill, the link 71 is replaced by a shorter link 71a (shown dotted and only in part; cf. Fig. 7), which connects the upper end of the lever 67 (at 70a) with a pivot 72 provided at the upper end of an arm 73 of an offset bellcrank carried on a shaft 74 rigidly fixed laterally in the rear portion of the cultivator main frame 1 between two struts (see Fig. 1). A rigid arm 75 of the bellcrank rides upon a cam (e. g., 76, 76a, or 76b; see Figs. 4, 6 and 7, and 5, respectively) fixed on stub shaft 5 (which also carries the left rear wheel 3 of the cultivator). The cut of the cam of course regulates the per-revolution anterior-posterior shifting of the shaft 43.

As illustrative only three cams are shown. Cam 76 is used to cause a twice-per-revolution shift; 76b a three-per-revolution, and 76a a four-per-revolution shift.

At the rear of the cultivator are two small plows 77, 77, on the usual drag supports, and controlled by lever 8.

The operation of the cultivator is obvious. The simple forward motion of the carriage effects a rotary motion of the hoe 46 by means of the transmission parts described. The rotation of shaft 43 may be arrested at will, even during forward movement of the cultivator as a whole, by disconnecting stub shaft 4 from the rest of the transmission means through use of the clutch (controlled by pedal 13). The hoe may be advanced or retrogressed by means of lever 9 when link 71 is used, or may be automatically and periodically arrested against absolute forward motion by means of a cam, etc., as described above,—link 71 being removed and link 71a being used. The prevention of absolute forward motion of the hoe, from time to time, is obviously for the purpose of causing the hoe to chop practically at right angles to the drill; the arrangement of the cams is such that after a relatively substantial interval of time during which the hoe has been retrogressed, even while the carriage moved forward, the hoe is then shifted forward almost instanter, so that when it descends into chopping position on the following revolution of its shaft 43 it will be properly disposed with respect to plants in the drill. The hoe may be swung slightly from side to side by means of the pedals 11 and 12 and their coacting parts previously described; and the hoe may be raised and lowered by means of lever 10 and its coacting parts. Obviously neither the longitudinal movements of the shaft 43 nor the up-and-down or sidewise displacements of the shaft axis interfere with the rotation of the hoe itself.

Having described our invention, we claim:

1. In a cross cultivator, a carriage; a shaft having a chopping hoe fixed radially therefrom, said shaft being connected flexibly to means for imparting rotation from the forward motion of said carriage; and means arranged to vary the relative height of said shaft while said shaft is rotating, said means including a journal frame arranged to be raised and lowered; and means arranged to vary the relative horizontal angular disposition of said shaft while said shaft is rotating, said means including a pivotally mounted frame carried on said carriage and supporting said first named frame; and means arranged to vary the longitudinal disposition of said shaft while said shaft is rotating, said means including a shift lever and a stubshaft and sleeve in said first named means.

2. In a cross cultivator, a carriage; a shaft having a chopping hoe fixed radially therefrom, said shaft being connected flexibly to means for imparting rotation to said shaft from the forward motion of said carriage; and means for periodically causing said hoe to rotate through a predetermined angular interval in substantially a plane notwithstanding the forward motion of said carriage, said means including a cam fixed on an axle of said carriage, said cam coacting with a shift lever arranged to vary the axial disposition of said shaft.

ROBERT E. LEDBETTER.
EDWIN LEDBETTER.